(12) United States Patent
Wang

(10) Patent No.: US 12,478,158 B1
(45) Date of Patent: Nov. 25, 2025

(54) LUGGAGE CASE CAPABLE OF CHANGING INTO TRAVEL CARRIER

(71) Applicant: Honghui Wang, Xingning (CN)

(72) Inventor: Honghui Wang, Xingning (CN)

( * ) Notice: Subject to any disclaimer, the term of this patent is extended or adjusted under 35 U.S.C. 154(b) by 0 days.

(21) Appl. No.: 19/088,629

(22) Filed: Mar. 24, 2025

(51) Int. Cl.
*A45C 13/26* (2006.01)
*A45C 9/00* (2006.01)

(52) U.S. Cl.
CPC ............. *A45C 13/262* (2013.01); *A45C 9/00* (2013.01); *A45C 2009/005* (2013.01)

(58) Field of Classification Search
CPC .... A45C 13/262; A45C 9/00; A45C 2009/005
USPC ............... 190/1, 18 A, 18 R; 280/37, 87.041
See application file for complete search history.

(56) References Cited

U.S. PATENT DOCUMENTS

| | | | |
|---|---|---|---|
| 3,314,494 A * | 4/1967 | Weitzner | B62K 15/00 280/87.041 |
| 3,316,993 A * | 5/1967 | Weitzner | A45C 9/00 180/209 |
| 3,413,011 A * | 11/1968 | Weitzner | B62B 3/02 280/37 |
| 5,207,440 A * | 5/1993 | Liang | A45C 13/262 280/47.11 |
| 9,033,350 B2 * | 5/2015 | Porri | A45C 5/146 280/37 |
| 2003/0034215 A1 * | 2/2003 | Lin | B62B 5/0083 190/18 R |

FOREIGN PATENT DOCUMENTS

| | | | |
|---|---|---|---|
| CN | 104486965 A | | 4/2015 |
| CN | 213820146 U | | 7/2021 |
| CN | 221489261 U | * | 8/2024 |
| CN | 119073723 A | | 12/2024 |

* cited by examiner

*Primary Examiner* — Sue A Weaver
(74) *Attorney, Agent, or Firm* — Nitin Kaushik

(57) ABSTRACT

The present invention belongs to the technical field of luggage cases and relates to a luggage case capable of changing into a travel carrier, including: an electric vehicle assembly, where the electric vehicle assembly includes a manipulation handle and a chassis with a front wheel and a rear wheel, the chassis includes a fixed portion and a telescopic portion, a driving member configured to drive the telescopic portion to extend forward is disposed in the fixed portion, and the manipulation handle is mounted on the telescopic portion to be configured to manipulate the front wheel to rotate; and a storage case, where the storage case is fixedly mounted on the fixed portion of the chassis and is used as a seat in a riding mode.

10 Claims, 10 Drawing Sheets

LUGGAGE CASE CAPABLE OF CHANGING INTO TRAVEL CARRIER

TECHNICAL FIELD

The present invention belongs to the technical field of luggage cases and relates to a luggage case capable of changing into a travel carrier.

BACKGROUND

In the field of modern travel tools, the function of luggage cases has gradually developed from a simple storage function to a multi-functional and intelligent direction. Conventional luggage cases are mainly used to store and transport items. Users usually need to move the luggage cases by dragging or carrying, especially during short-distance travel in airports, stations, or cities. The way the luggage cases move may cause fatigue to the users, especially during long-distance walking.

To solve the inconvenience of the users in short-distance movement, some electric luggage cases have appeared on the market, which are combined with electric driving systems to enable the luggage cases to automatically drive at a certain speed. However, the existing electric luggage cases usually have the following problems:
1. Fixed structure: most of the electric luggage cases adopt a fixed manipulation handle and cannot be telescopically adjusted, resulting in a lack of flexibility for the users in different use scenarios.
2. Lack of seat conversion: although some luggage cases support electric traveling, the users still need to stand or follow and cannot be comfortably supported during riding, thereby reducing the use experience.

In view of the above problems, the present invention provides a luggage case capable of changing into a travel carrier, which aims to enable the luggage case to have an electric riding function through an innovative structural design and to freely switch between an electric vehicle mode and an ordinary luggage case mode, thereby improving the travel experience of the users.

SUMMARY

In view of deficiencies in the prior art, a purpose of the present invention is to provide a luggage case capable of changing into a travel carrier, which can switch between an ordinary luggage case mode and an electric riding mode, to adapt to different use requirements and provide better portability and comfort at the same time.

To achieve the foregoing purpose, the present invention adopts the following technical solutions:
a luggage case capable of changing into a travel carrier, including:
an electric vehicle assembly, where the electric vehicle assembly includes a manipulation handle and a chassis with a front wheel and a rear wheel, the chassis includes a fixed portion and a telescopic portion, a driving member configured to drive the telescopic portion to extend forward is disposed in the fixed portion, and the manipulation handle is mounted on the telescopic portion to be configured to manipulate the front wheel to rotate; and
a storage case, where the storage case is fixedly mounted on the fixed portion of the chassis and is used as a seat in a riding mode; and
when the driving member drives the telescopic portion to extend forward, the manipulation handle moves from an initial storage position to a manipulatable state to control steering of the front wheel, and the storage case is configured as the seat to bear a weight of a user at the same time.

Further, the fixed portion is provided with a sliding rail; and
a sliding sleeve is sleeved outside the sliding rail, the sliding sleeve can perform reciprocating sliding along a direction of the sliding rail, and the telescopic portion is connected to the fixed portion through the sliding sleeve.

Further, the driving member is a spring, the sliding rail is internally provided with a guide groove, and the spring is mounted in the guide groove to abut against the telescopic portion,
so that the spring releases an elastic force to drive the telescopic portion to extend forward in an unlocked state.

Further, an elastic latch is disposed on a surface of the sliding rail; and front and rear sections of the sliding sleeve are provided with positioning holes
respectively, and when the manipulation handle is located at the initial storage position or in the manipulatable state, the elastic latch is located in a corresponding positioning hole, to ensure that the telescopic portion is stably locked in two states.

Further, an unlocking button is disposed at a rear end of the sliding rail, and the unlocking button is configured to drive the elastic latch to retract.

Further, a hub motor is disposed in the front wheel, and the hub motor is configured to drive the front wheel to rotate to drive the luggage case to travel; and
the manipulation handle is electrically connected to the hub motor to be configured to manipulate the hub motor.

Further, the manipulation handle is mounted on the telescopic portion through a rotating shaft; and
a housing is sleeved outside the rotating shaft, a gap is formed between the housing and the rotating shaft, and a battery and a control mainboard are disposed in the gap.

Further, the rotating shaft is provided with an adjusting rod, and the adjusting rod can extend and retract along an axial direction of the rotating shaft; and
the manipulation handle is mounted on the adjusting rod, to adjust a height of the manipulation handle.

Further, the driving member is an electric telescopic rod, and a mover of the telescopic rod is connected to the telescopic portion.

Further, the storage case is detachably connected to the fixed portion.

Further, a bottom end of the storage case is provided with a sliding groove, and the fixed portion is located in the sliding groove;
a side surface of the storage case is provided with a telescopic hook, and the telescopic hook can slide relative to the storage case; and
the fixed portion is provided with a positioning groove, and the telescopic hook can be inserted into the positioning groove to fix the storage case.

Further, the side surface of the storage case is provided with a receding button, and the receding button is configured to drive the telescopic hook to unlock, so that the storage case can slide to be separated along a direction of the sliding groove.

The technical solutions of the present invention are applied to implement free switching between the luggage case mode and the riding mode, a stable manipulation structure, an efficient driving manner, and an optimized storage function. Through technical features such as the electric vehicle assembly, the telescopic manipulation handle, the driving telescopic mechanism, and the seat conversion of the storage case, an intelligent luggage case integrated with a short-distance transportation function is implemented. When the user needs to ride, the driving member drives the telescopic portion to extend forward, so that the manipulation handle moves from the initial storage position to the manipulatable state and controls the steering of the front wheel. The storage case is configured as the seat to bear the weight of the user at the same time, to ensure comfort and stability in the riding mode. A telescopic design of the manipulation handle ensures structural compactness, so that the luggage case maintains a conventional size in a non-riding state and provides ergonomic manipulation experience in the riding mode at the same time.

Additional features and advantages of the invention will be set forth in the description which follows, and in part will be obvious from the description, or may be learned by implementing the present invention. The purpose and other advantages of the present invention may be implemented and obtained by a structure particularly pointed out in the written specification and drawings.

BRIEF DESCRIPTION OF THE DRAWINGS

The present invention is described in detail below with reference to the accompanying drawings, to make the above advantages of the present invention clearer.

DETAILED DESCRIPTION OF THE EMBODIMENTS

Figure 1:
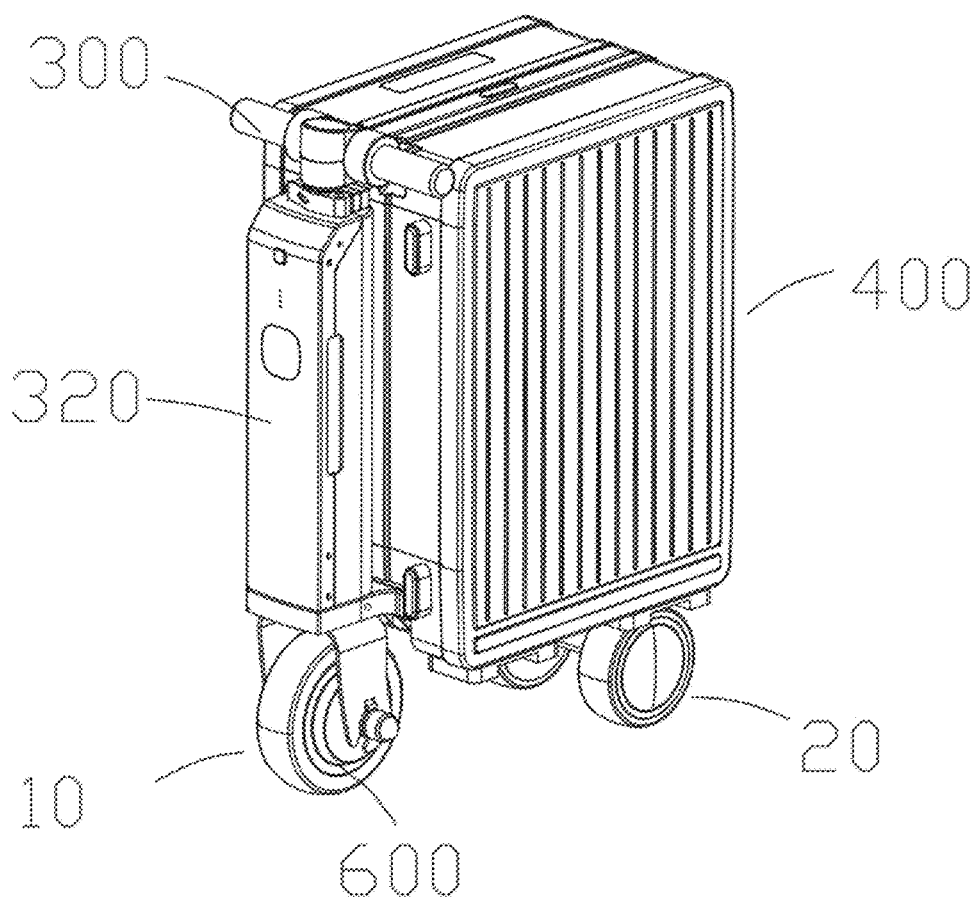
FIG. 1 is a schematic diagram of an initial state of a luggage case capable of changing into a travel carrier according to the present invention.
Figure 2:
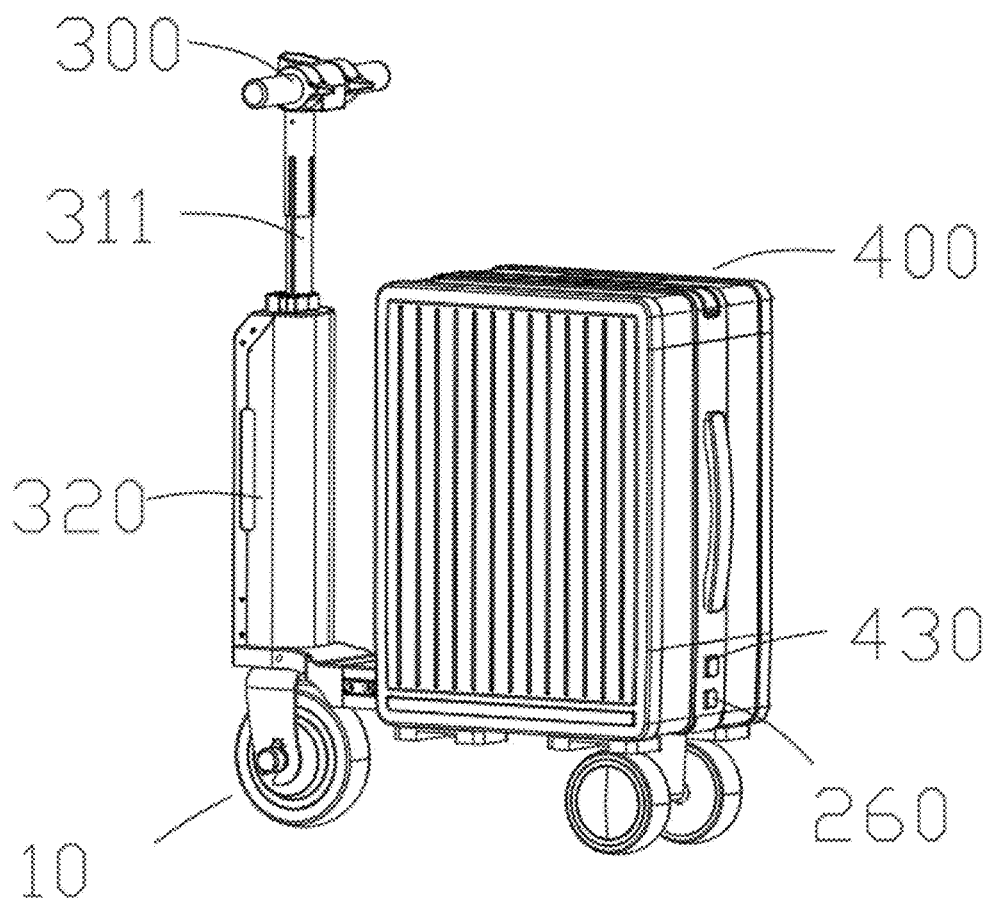
FIG. 2 is a schematic diagram of a riding state of a luggage case capable of changing into a travel carrier according to the present invention.

Embodiments of the present invention are described in detail below and examples of the embodiments are shown in the accompanying drawings, where the same or similar reference numerals always represent the same or similar elements or elements with the same or similar functions. The embodiments described below with reference to the accompanying drawings are exemplary and are intended to explain the present invention, but shall not be understood as a limitation on the present invention.

In the description of the present invention, it should be noted that, the orientations or positional relationships indicated by the terms "length", "width", "up", "down", "front", "back", "left", "right", "vertical", "horizontal", "top", "bottom", "inside", "outside", and the like are based on those shown in the accompanying drawings, intended only for the convenience of describing the present invention and for simplifying the description, and not intended to indicate or imply that the referred apparatus or element must be provided with a particular orientation or constructed and operated with a particular orientation, therefore not allowed to be construed as a limitation of the present invention.

Furthermore, the terms "first" and "second" are intended only for descriptive purposes and should not be construed as indicating or implying their relative importance or implying the quantity of technical features indicated. Therefore, features defined by "first" and "second" may explicitly or implicitly include one or more of these features. In the description of the present invention, the meaning of "plurality" is at least two, unless otherwise specifically defined.

In the embodiments of the present invention, unless otherwise expressly specified and defined, the terms "mounted", "attached", "connected", "fixed", and the like should be understood in a broad sense, for example, a connection may be a fixed connection, a detachable connection, or an integral connection; it may be a mechanical connection or an electrical connection; it may be a direct connection or an indirect connection via an intermediate medium; and it may be a connection between two elements or an interaction between two elements. For those of ordinary skill in the art, the specific meanings of the above terms in the present invention can be understood on a case-by-case basis.

Referring to FIG. 1 to FIG. 6, a luggage case capable of changing into a travel carrier, including:

an electric vehicle assembly 100, where the electric vehicle assembly 100 includes a manipulation handle 300 and a chassis 200 with a front wheel 10 and a rear wheel 20, the chassis 200 includes a fixed portion 210 and a telescopic portion 220, a driving member configured to drive the telescopic portion 220 to extend forward is disposed in the fixed portion 210, and the manipulation handle 300 is mounted on the telescopic portion 220 to be configured to manipulate the front wheel 10 to rotate; and a storage case 400, where the storage case 400 is fixedly mounted on the fixed portion 210 of the chassis 200 and is used as a seat in a riding mode.

When the driving member drives the telescopic portion 220 to extend forward, the manipulation handle 300 moves from an initial storage position to a manipulatable state to control steering of the front wheel 10, and the storage case 400 is configured as the seat to bear a weight of a user at the same time.

The present invention relates to the luggage case capable of changing into a travel carrier, and the core design thereof is to combine a conventional luggage case with an electric riding function, to provide a travel tool that can freely switch between a luggage case mode and an electric riding mode. The luggage case of the present invention mainly includes the electric vehicle assembly 100 and the storage case 400. The electric vehicle assembly 100 includes the chassis 200, the front wheel 10, the rear wheel 20, and the manipulation handle 300. The chassis 200 is composed of the fixed portion 210 and the telescopic portion 220, and the telescopic portion 220 may move along a front-rear direction under the action of the driving member, so that the manipulation handle 300 extends from the initial storage position to the manipulatable state, to facilitate controlling the steering of the front wheel 10. The storage case 400 is fixedly mounted on the fixed portion 210 of the chassis 200 and is used as the seat in the riding mode, to bear the weight of the user.

A working principle of the present invention is based on a telescopic structure of the electric vehicle assembly 100, so that the luggage case can flexibly switch between different modes. In the ordinary luggage case mode, the telescopic portion 220 is in a retracted state, the manipulation handle 300 is accommodated in a case body structure, and the user may drag or lift the luggage case like the conventional luggage case. When the user needs to enter the riding mode, the driving member may drive the telescopic portion 220 to extend forward, so that the manipulation handle 300 moves to the manipulatable state. The storage case 400 remains fixed and is used as the seat at the same time, and the user may ride on the storage case 400 for manipulation. The manipulation handle 300 is connected to the front wheel 10 to adjust a direction of the front wheel 10 in a mechanical or an electric control manner, to implement accurate steering control during riding.

Compared with an existing electric luggage case, the present invention has higher adaptability and convenience. First, the present invention adopts a telescopic design, so that the luggage case can maintain a compact structure of the conventional luggage case without using the riding mode, thereby meeting airline boarding and daily storage requirements. Then, the telescopic portion 220 moves forward and rearward through the driving member, so that the manipulation handle 300 can stably switch between a storage state and a use state, thereby improving use convenience and safety. In addition, the present invention adopts a stable support structure of the storage case 400, so that the storage case can provide a reliable seat function in the riding mode, thereby ensuring comfort and a bearing capability of the user during riding.

The present invention is innovative in that the structural design of the present invention enables the luggage case to be not limited to a conventional storage function and to be used as a short-distance transportation tool, thereby greatly improving a use value of the luggage case. The technical solutions of the present invention may be widely applicable to scenarios that need long-distance walking, such as an airport, a station, and a shopping mall, to provide a more efficient and convenient travel manner for the user.

In the embodiment, the fixed portion 210 is provided with a sliding rail 230.

A sliding sleeve 240 is sleeved outside the sliding rail 230, the sliding sleeve 240 can perform reciprocating sliding along a direction of the sliding rail 230, and the telescopic portion 220 is connected to the fixed portion 210 through the sliding sleeve 240.

The sliding rail 230 is used as a guide and support structure of the telescopic portion 220, to ensure that the telescopic portion 220 can stably extend and retract along a preset trajectory. The sliding rail 230 may be made of a high-strength material, for example, aluminum alloy or stainless steel, to provide enough strength and wear resistance while maintaining light weight. The length and an arrangement manner of the sliding rail 230 are optimized according to the overall size and a telescopic range of the luggage case, to ensure that the telescopic portion 220 is closely attached to the fixed portion 210 in an accommodated state and can provide enough traveling space in an extended state.

The sliding sleeve 240 is sleeved outside the sliding rail 230, and the sliding sleeve 240 supports and limits the sliding rail 230, so that the telescopic portion 220 can perform the reciprocating sliding along the direction of the sliding rail 230. A ball bearing or a low-friction bushing may be disposed in the sliding sleeve 240, to reduce sliding resistance and improve smoothness during extension and retracting, thereby ensuring that the manipulation handle 300 is smoothly extended or accommodated during mode switching. Meanwhile, a structural design of the sliding sleeve 240 needs to ensure that the sliding sleeve can be stably fixed on the sliding rail 230 during sliding, to avoid swaying or lateral displacement, thereby improving overall stability of a telescopic mechanism.

The telescopic portion 220 is connected to the fixed portion 210 through the sliding sleeve 240, and the sliding sleeve 240 is used as a middle connecting member between the sliding rail 230 and the telescopic portion 220, so that the telescopic portion 220 moves on the sliding rail 230 more stably and smoothly. The sliding sleeve 240 may be fixed with the telescopic portion 220 through a screw or in a snap-fit manner, to ensure that the telescopic portion 220 does not misalign during sliding and to facilitate maintenance and replacement. When the driving member drives the telescopic portion 220 to extend or retract, the sliding sleeve 240 moves along the sliding rail 230, so that the telescopic portion 220 stably moves forward and rearward, thereby switching from the ordinary mode to the riding mode by the luggage case.

A structural design of the sliding rail 230—the sliding sleeve 240 in the embodiment provides an efficient and stable telescopic mechanism, so that the manipulation handle 300 is extended and accommodated more smoothly, and a frictional loss is reduced at the same time, thereby improving reliability of the luggage case during long-term use. In addition, the structural design enables a movement trajectory of the telescopic portion 220 to be more controllable, to avoid an unstable movement due to an external impact or gravity, thereby improving safety and durability of the overall structure.

In the embodiment, the driving member is a spring 510, the sliding rail 230 is internally provided with a guide groove 231, and the spring 510 is mounted in the guide groove 231 to abut against the telescopic portion 220, so that the spring 510 releases an elastic force to drive the telescopic portion 220 to extend forward in an unlocked state.

By preloading elastic potential energy of the spring 510, the elastic force is released in the unlocked state, to drive the telescopic portion 220 to extend forward along the sliding rail 230, so that the manipulation handle 300 enters the manipulatable state quickly. The design enables the luggage case to switch from the ordinary mode to the riding mode in a short period of time without additional electric power driving, thereby improving use convenience and reliability.

The sliding rail 230 is internally provided with the guide groove 231, and the guide groove 231 is arranged along a longitudinal direction of the sliding rail 230 and is configured to limit a movement path of the spring 510, to ensure that the spring 510 acts stably on the telescopic portion 220 when releasing the elastic force and does not cause component deflection or swaying due to a lateral force. The design of the guide groove 231 optimizes a constraint property of the spring 510, so that a driving force can be accurately transmitted along a direction of the sliding rail 230, thereby improving movement accuracy and stability of the telescopic portion 220.

The spring 510 is mounted in the guide groove 231 and abuts against the telescopic portion 220, and when the luggage case is in the accommodated state, the spring 510 is in a compressed state and stores the elastic potential energy. After the user triggers an unlocking mechanism, the spring 510 is released from the compressed state and quickly pushes the telescopic portion 220 to move forward along the sliding rail 230, so that the manipulation handle 300 extends, and the user may directly enter the riding mode. To prevent an impact force generated when the spring 510 is released from affecting the stability of the telescopic portion 220, in the embodiment, a buffer apparatus may be disposed at a terminal of the telescopic portion 220, for example, a shock-absorbing rubber pad or a damping structure, to reduce vibration and improve structural reliability.

Advantages of spring 510 driving lie in low costs and lightweight design, to enable the overall structure to be more economical and applicable. Compared with an electric driving system, the spring 510 driving not only reduces manufacturing costs, but also reduces dependence on an electrical component, which is applicable to a scenario that puts low requirements on endurance or needs to optimize weight. In addition, a spring 510 driving structure does not require electric power support, and the user may still switch the luggage case mode normally in a low-power or no-power state, thereby improving practicality of the product. Since the spring 510 may be made of high-strength alloy steel or carbon steel, the spring is long in long-term service life and can bear high-frequency repetitive telescopic cycles, thereby ensuring durability and reliability of the system.

A spring 510 driving solution in the embodiment enables the luggage case to have a lighter overall weight while ensuring the structural compactness, which is especially applicable to a user with high requirements for portability. Meanwhile, the design reduces complexity of an electronic control system, reduces maintenance costs, and enhances long-term stability of a device, thereby providing an efficient, reliable, and economical mode switching solution for the user.

Figure 3:
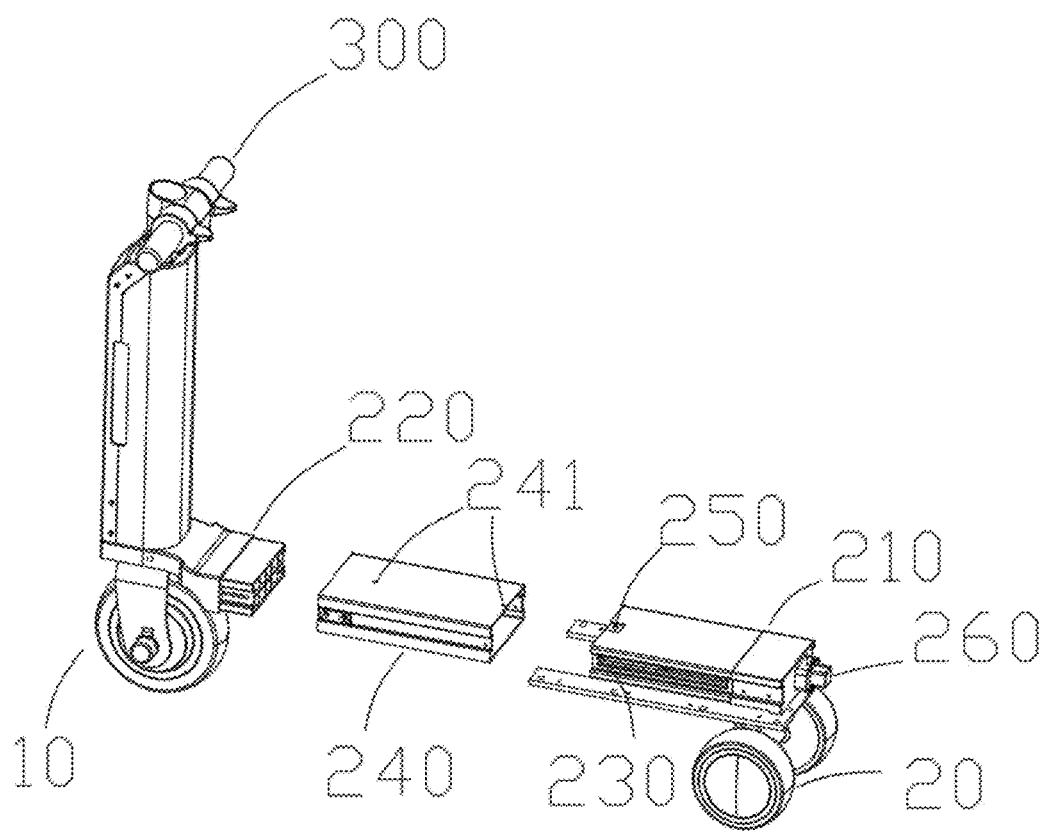
FIG. 3 is a schematic diagram of an electric vehicle assembly of a luggage case capable of changing into a travel carrier according to the present invention.
Figure 5:
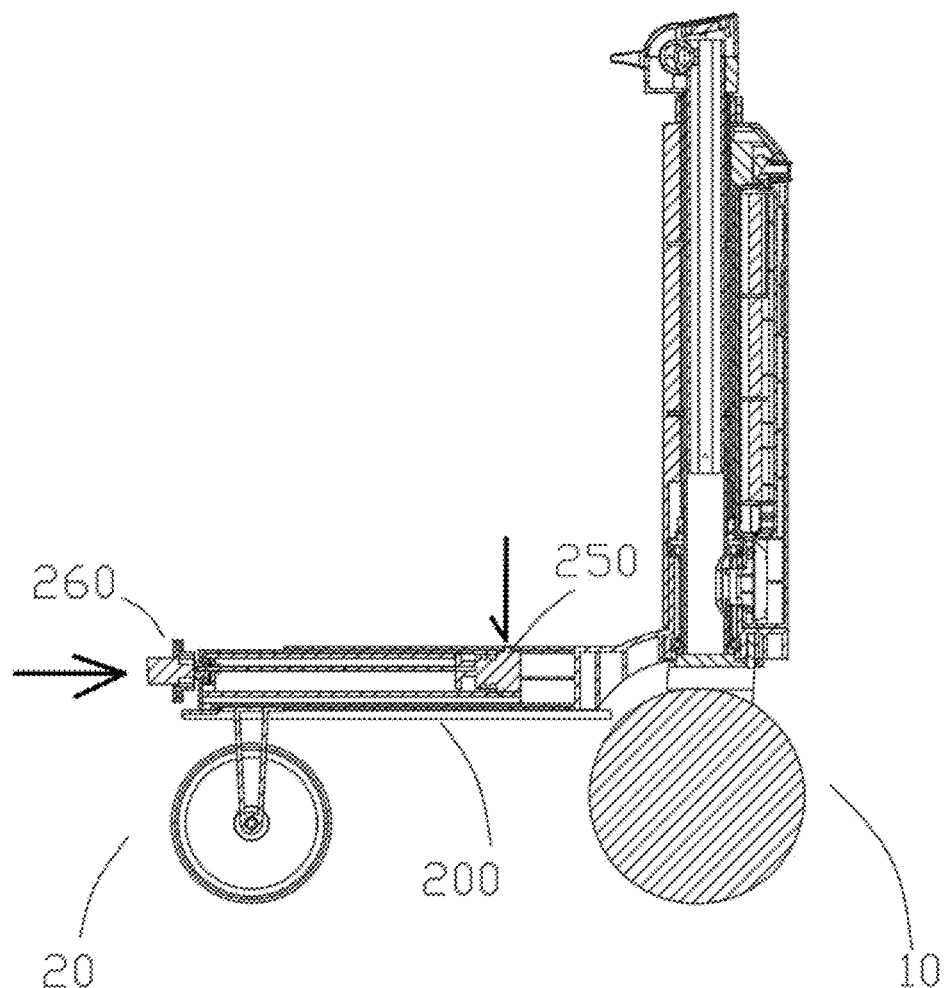
FIG. 5 is a sectional view of an electric vehicle assembly of a luggage case capable of changing into a travel carrier according to the present invention.

Referring to FIG. 3 and FIG. 5, in the embodiment, an elastic latch 250 is disposed on a surface of the sliding rail 230.

Front and rear sections of the sliding sleeve 240 are provided with positioning holes 241 respectively. When the manipulation handle 300 is located at the initial storage position or in the manipulatable state, the elastic latch 250 is located in a corresponding positioning hole 241, to ensure that the telescopic portion 220 is stably locked in two states.

The elastic latch 250 is disposed on the surface of the sliding rail 230, and the elastic latch 250 is used as a locking mechanism of the telescopic portion 220, to ensure stability and reliability of the elastic latch during switching between the ordinary luggage case mode and the riding mode. The front and rear sections of the sliding sleeve 240 are provided with the positioning holes 241 respectively. When the manipulation handle 300 is located at the initial storage position or in the manipulatable state, the elastic latch 250 can be matched with the corresponding positioning hole 241, to accurately lock the telescopic portion 220 in the two states.

In a spring 510 driving mode, a structure of the elastic latch 250 works in conjunction with double positioning holes 241 on the sliding sleeve 240, so that switching of the luggage case mode is smoother and safer. In an initial storage state of the luggage case, the spring 510 is in the compressed state, and the elastic latch 250 is inserted into the positioning hole 241 at a front end of the sliding sleeve 240, to ensure that the telescopic portion 220 is in the accommodated state and to prevent the telescopic portion from being extended due to an accidental touch caused by an external force. When the user needs to enter the riding mode, the elastic latch 250 may be unlocked manually or through a releasing mechanism, to enable the spring 510 to release the elastic force, thereby driving the telescopic portion 220 to extend forward along the sliding rail 230. After the telescopic portion 220 extends to a set position, the elastic latch 250 is automatically ejected into the positioning hole 241 at a rear end of the sliding sleeve 240, to stably fix the manipulation handle 300, so that the manipulation handle enters the manipulatable state, thereby ensuring that the user can ride safely.

An advantage of the structure is that reliable mechanical fixing may be implemented without an additional electric locking system, thereby reducing system complexity, reducing energy consumption, and improving durability of the product. The elastic latch 250 may be made of high-strength metal spring 510 steel or wear-resistant engineering plastic, to ensure that fatigue damage does not occur during long-term use. In addition, the locking mechanism can effectively prevent the telescopic portion 220 from being extended or retracted accidentally due to external violation or impact, thereby enhancing safety. After completing riding, the user only needs to trigger the unlocking mechanism again to enable the elastic latch 250 to be separated from the positioning hole 241 at the rear end, so that the telescopic portion 220 returns to the initial storage position under the pre-compressing action of the spring 510 and is re-locked to be in the positioning hole 241 at the front end, thereby ensuring that the luggage case can be restored to the ordinary luggage case mode stably.

In conclusion, the embodiment adopts a combination solution of the elastic latch 250+the double positioning holes 241+the spring 510 driving to implement a mode switching and locking manner with a simple structure, a convenient operation, low costs, and high reliability, so that the luggage case can remain stable in the two modes, to avoid a misoperation, thereby improving user experience. The design is not only applicable to an electric luggage case mode conversion scenario, but also can be widely applied to other mobile device fields requiring the stable telescopic mechanism.

In the embodiment, an unlocking button 260 is disposed at a rear end of the sliding rail 230, and the unlocking button 260 is configured to drive the elastic latch 250 to retract. The unlocking button 260 is configured to control the elastic latch 250 to retract, thereby unlocking the telescopic portion 220, so that the telescopic portion can extend or retract smoothly on the sliding rail 230. The design of the unlocking button 260 enables the user to manually control state switching of the telescopic mechanism, thereby ensuring that switching between the luggage case mode and the riding mode is more convenient and safer.

In the ordinary mode of the luggage case, the elastic latch 250 is in a locked state and is inserted into the positioning hole 241 at the front end of the sliding sleeve 240, to fix the telescopic portion 220 and prevent the telescopic portion from being accidentally extended in a non-use state. When the user needs to enter the riding mode, the unlocking button 260 may be pressed down, and the button acts on the elastic latch 250 through a mechanical linkage apparatus or a lever mechanism, to enable the elastic latch to be separated from the positioning hole 241, so that the spring 510 drives the telescopic portion 220 to extend forward along the sliding rail 230. After the telescopic portion 220 reaches the manipulatable state, the elastic latch 250 is automatically inserted into the positioning hole 241 at the rear end of the sliding sleeve 240 under the action of the reset spring 510, to implement stable locking in the riding mode.

After the riding mode ends, the user may press the unlocking button 260 again, to enable the elastic latch 250 to be separated from the positioning hole 241 at the rear end of the sliding sleeve 240, thereby releasing the locked state. At this time, the user may retract the telescopic portion 220 to the initial storage position through an external force or a spring 510 reset mechanism. After the telescopic portion 220 retracts completely, the elastic latch 250 is inserted into the positioning hole 241 at the front end again, to re-fix the telescopic portion 220, so that the luggage case restores to the ordinary mode.

The design of the unlocking button 260 of the embodiment simplifies an operation procedure of mode switching, so that the user can quickly unlock and lock the telescopic mechanism by controlling a single button. The button may adopt a mechanical spring 510 reset structure, to ensure automatic reset after being pressed and released, thereby avoiding a failure of the locking mechanism due to the misoperation. In addition, a position of the unlocking button 260 is optimized, and the unlocking button is usually arranged at a rear end of the manipulation handle 300 or the sliding rail 230, so that the user can easily touch the button during riding and accommodation, thereby improving operation convenience and ergonomic experience.

An advantage of the design is that stable mechanical locking and unlocking may be implemented without a complex electric control system, thereby effectively reducing energy consumption, reducing manufacturing costs, and improving reliability and durability of the system. Meanwhile, the solution ensures that the luggage case can be stably locked in the two modes, to avoid accidental extension or retraction due to vibration or an accidental touch, thereby improving use safety. The solution is not only applicable to the electric luggage case mode conversion of the present invention, but also can be widely applied to other devices requiring a telescopic structure for locking and control, for example, a foldable transportation tool and a telescopic sliding rail 230 apparatus.

Figure 4:
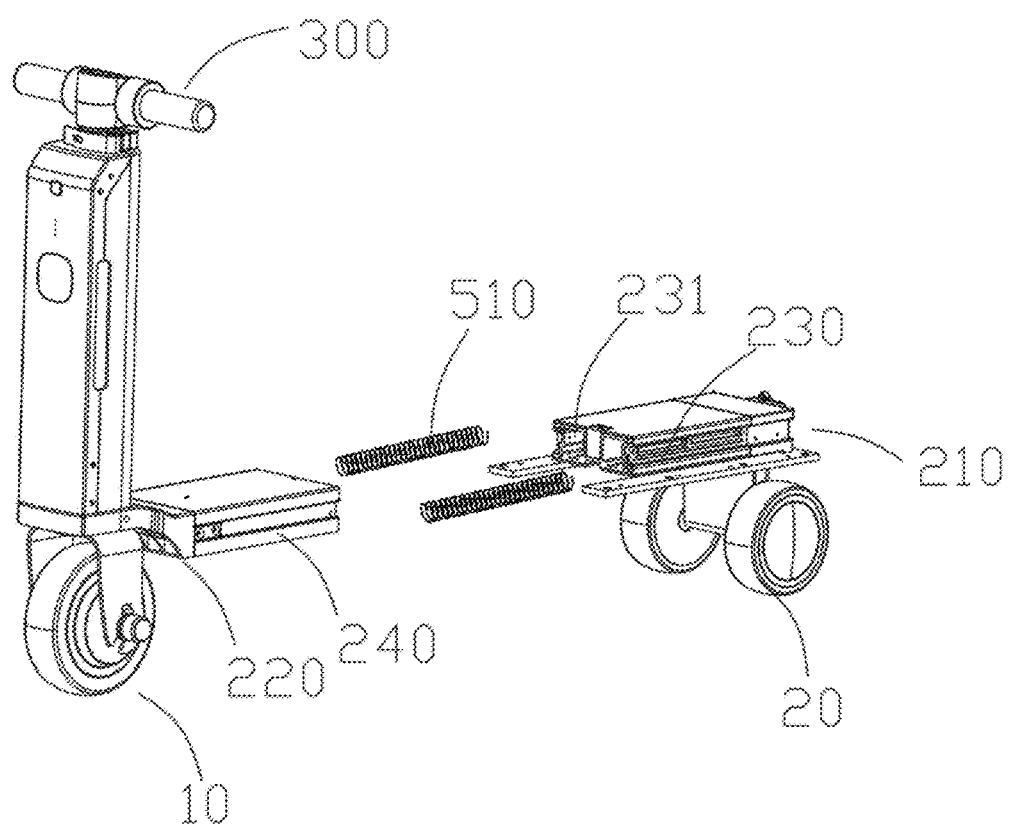
FIG. 4 is a schematic diagram of a chassis of an electric vehicle assembly of a luggage case capable of changing into a travel carrier according to the present invention.
Figure 6:
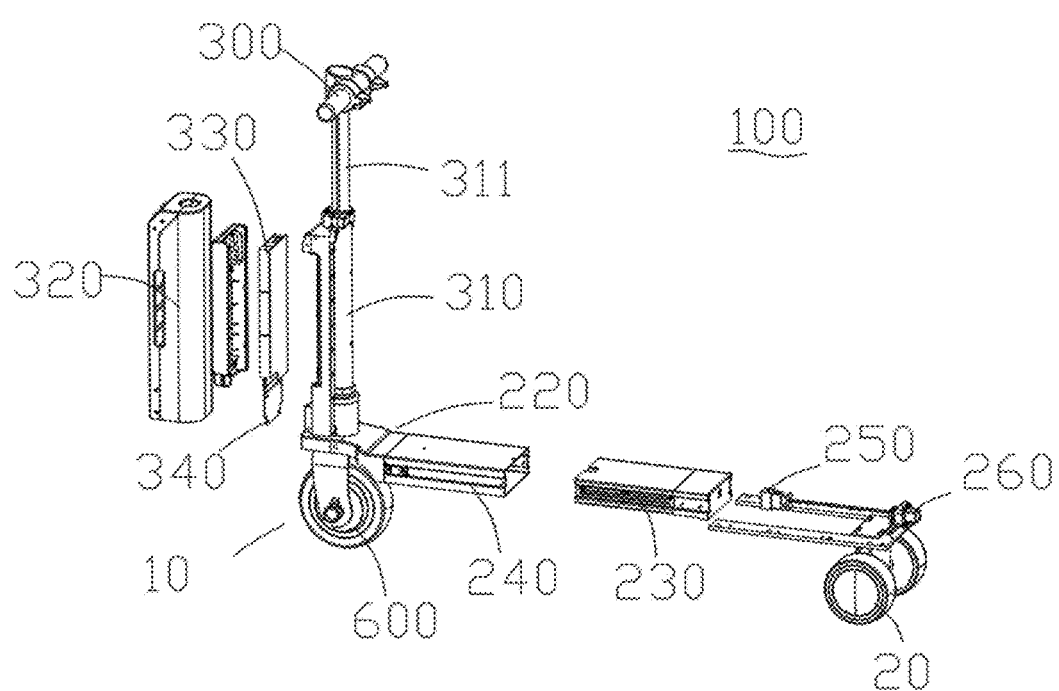
FIG. 6 is an exploded view of an electric vehicle assembly of a luggage case capable of changing into a travel carrier according to the present invention.

Referring to FIG. 4 to FIG. 6, in the embodiment, a hub motor 600 is disposed in the front wheel 10, and the hub motor 600 is configured to drive the front wheel 10 to rotate to drive the luggage case to travel.

The manipulation handle 300 is electrically connected to the hub motor 600 to be configured to manipulate the hub motor 600. The hub motor 600 is integrated into the front wheel 10 and directly drives the front wheel 10 to rotate, to provide traveling power for the luggage case. The manipulation handle 300 is electrically connected to the hub motor 600 and is configured to control start, stop acceleration, and deceleration of the motor, thereby manipulating riding of the luggage case. According to the solution in the embodiment, through an integrated design of the hub motor 600, a conventional transmission structure such as belt transmission, chain transmission, or gear transmission is saved, a system structure is greatly optimized, and occupied space of the motor is reduced at the same time, so that the luggage case is more compact and lighter overall. As a core driving unit of the present invention, the hub motor 600 has the greatest advantages of being highly integrated, directly driven, and free from external transmission losses. A conventional electric vehicle generally adopts an external motor and transmits power to a wheel through a mechanical transmission structure such as a belt and a chain. In the solution of the embodiment, the hub motor 600 is directly embedded into the front wheel 10, and a motor rotor and the wheel are integrally designed, so that electric energy is directly converted into rotating power of the wheel, thereby saving an additional mechanical transmission apparatus, reducing energy losses, and improving power transmission efficiency. In addition, the solution simplifies a whole vehicle structure, so that the luggage case can reduce a volume and a weight while ensuring a riding function, thereby improving portability.

The manipulation handle 300 is electrically connected to the hub motor 600, and this connection may be implemented through a wired manner such as wire transmission or a wireless manner such as Bluetooth and wireless signal control. An electric control unit may be disposed on the manipulation handle 300, which includes an acceleration controller, a brake controller, and a mode switching key. The user may adjust a traveling speed and a braking and power mode of the luggage case through the manipulation handle 300. The manipulation handle 300 is electrically connected to the motor, so that the user can accurately control a traveling state of the luggage case, thereby improving manipulation experience in the riding mode.

Compared with a driving manner by using a conventional motor, the solution of driving by using the hub motor 600 has the following significant advantages:

Simplified structure for reducing occupied space: the hub motor 600 is directly embedded into the front wheel 10, and external mounting of the conventional motor and a transmission component are canceled, so that internal space of the luggage case is fully utilized and may be used for storing a battery, a control system, and the like, thereby improving overall compactness.

Efficient transmission for reducing energy losses: the conventional motor drives the wheel through a mechanical transmission system, which inevitably has energy losses, while the hub motor 600 directly drives the wheel, thereby reducing additional transmission losses, improving energy utilization rate, and extending a battery life.

Maintenance cost reduction for improving reliability: since a vulnerable component such as a transmission chain and a gear is canceled, a whole structure of the hub motor 600 is more durable, thereby reducing a daily maintenance requirement and improving a service life of the luggage case.

Quiet operation for improving user experience: compared with the conventional mechanical transmission system, operation noise of a brushless motor structure of the hub motor 600 is lower, so that riding is quieter and more comfortable, thereby improving the user experience.

According to the design of the hub motor 600 of the embodiment, the luggage case has a higher degree of integration, a lightweight structure and a higher energy efficiency conversion rate, and a linkage design between the manipulation handle 300 and the motor is optimized at the same time, so that the user can control the traveling state of the luggage case more intuitively and accurately. In addition, the technical solution avoids complexity of the conventional mechanical transmission system, so that an intelligent riding luggage case of the present invention is more in line with market requirements for portability, intelligence, and low energy consumption, and is applicable to various application scenarios such as short-distance travel, airport commuting, and city transportation.

In the embodiment, the manipulation handle 300 is mounted on the telescopic portion 220 through a rotating shaft 310.

A housing 320 is sleeved outside the rotating shaft 310, a gap is formed between the housing 320 and the rotating shaft 310, and a battery 330 and a control mainboard 340 are disposed in the gap. The manipulation handle 300 is mounted on the telescopic portion 220 through the rotating shaft 310 and controls the steering of the front wheel 10 through the rotating shaft 310. The design enables the manipulation handle 300 to perform accurate steering in the riding mode and to be folded or hidden in the accommodated state, to reduce an overall volume of the luggage case, thereby improving storage efficiency.

In the riding mode, the user holds the manipulation handle 300 and directly manipulates the steering of the front wheel 10 through a rotating shaft 310 mechanism, to ensure good manipulability and steering response during riding. The rotating shaft 310 is made of high-strength alloy or wear-resistant engineering plastic and can maintain stability while providing flexible steering, to avoid loosening or loss of control due to violent rotation during riding. In addition, the rotating shaft 310 mechanism may be provided with a limiting apparatus, to avoid over-range rotation, thereby improving safety and comfort of manipulation.

The housing 320 is sleeved outside the rotating shaft 310. The housing 320 not only plays a role of protecting the rotating shaft 310, but also is configured to integrate an electrical assembly, to optimize whole vehicle wiring and electronic control system layout. The housing 320 is made of a light impact-resistant material such as aluminum alloy or high-strength ABS plastic, to ensure that an electronic element is not damaged due to an external impact or vibration during riding.

The gap is formed between the housing 320 and the rotating shaft 310, and the gap is configured to accommodate electronic devices including the battery 330 and the control mainboard 340. As a main energy supply unit of the present invention, the battery 330 provides stable electric power support for the hub motor 600, the control system, and other electronic devices. The design moves the battery from the inside of the luggage case to the manipulation handle 300, so that storage space of the luggage case is maximized, and occupied space of the battery in the luggage case is reduced at the same time, thereby improving rationality of an overall layout. In addition, the battery 330 is integrated into the manipulation handle 300, so that the battery is easier to maintain, replace, or update, thereby improving use convenience.

The control mainboard 340 is mounted in the housing 320 at a front end of the manipulation handle 300 and is connected to the hub motor 600 and a manipulation key through a wire or through wireless connection, to implement traveling control, brake adjustment, speed adjustment, and other functions. An advantage of the design is that wiring complexity of an electrical system is reduced, and a response speed of whole vehicle control is improved at the same time, so that manipulation is more accurate and reliable.

In the embodiment, the rotating shaft 310 is provided with an adjusting rod 311, and the adjusting rod 311 can extend and retract along an axial direction of the rotating shaft 310.

The manipulation handle 300 is mounted on the adjusting rod 311, to adjust the height of the manipulation handle 300.

The rotating shaft 310 is provided with the adjusting rod 311, and the adjusting rod 311 can extend and retract along the axial direction of the rotating shaft 310, to adjust the height of the manipulation handle 300, to adapt to requirements of different use modes. The manipulation handle 300 is mounted on the adjusting rod 311 and can be adjusted in height according to a user requirement, to provide more ergonomic operation experience.

In an initial luggage case mode, the manipulation handle 300 is in the accommodated state, and the height thereof is flush with a top portion of the luggage case, so that the luggage case is more compact in appearance and is convenient to store and carry, and a protruding component is prevented from affecting the user to dragging the luggage case or storing the luggage case in small space such as a cabin luggage rack or a compartment luggage rack. In the state, the adjusting rod 311 is in a fully retracted state, and the manipulation handle 300 is tightly attached to the top portion of the luggage case, to avoid unnecessary exposure, thereby improving overall aesthetics and portability of the luggage case.

In the riding mode, to facilitate holding and manipulating the front wheel 10 by the user, the manipulation handle 300 needs to be adjusted in height. The user may stretch the manipulation handle 300 upward through a telescopic mechanism of the adjusting rod 311, to enable the manipulation handle to be lifted to a height suitable for riding and manipulation. The telescopic mechanism of the adjusting rod 311 may adopt sliding rail 230 limiting, an elastic snap fit, rotary knob locking, an air pressure booster rod, a spiral telescopic rod, and other manners, to ensure stability and safety of height adjustment. After the user adjusts to a proper height, the adjusting rod 311 can be fixed at a set position through a locking mechanism, to prevent the manipulation handle 300 from loosening or sliding down due to vibration or an external force during riding.

A structural design of the adjusting rod 311 not only improves smoothness of switching between the luggage case mode and the riding mode, but also enhances comfort and safety during riding. The user may freely adjust the height of the manipulation handle 300 according to the height and a riding habit of the user, so that steering control is more natural, and manipulation feeling is more ergonomic, thereby improving traveling stability and reducing a fatigue feeling brought by long-time riding. In addition, the design further enables users with different heights to obtain good riding experience, thereby improving an applicable range of the luggage case of the present invention.

Main advantages of the design solution include:

Improving manipulation comfort of the riding mode: by adjusting the height of the manipulation handle 300, the user can obtain a more ergonomic manipulation angle during riding, to improve manipulation stability and comfort.

Enhancing portability of the luggage case mode: in the accommodated state, the manipulation handle 300 is flush with the top portion of the luggage case, to prevent the protruding component from affecting luggage case storage while improving the overall aesthetics.

Adapting to different user requirements: a telescopic design of the adjusting rod 311 enables the users with different heights to freely adjust to proper heights, to improve applicability and enhance the user experience.

Ensuring safety with the locking mechanism: after extension, the adjusting rod 311 can be fixed through a locking apparatus, to avoid accidental loosening or sliding down during riding, thereby improving the use safety.

Optimizing manipulation experience: the adjusted height enables the user to perform steering more flexibly and accurately, to improve control stability of the front wheel 10, so that riding is more stable.

In conclusion, in the embodiment, through the telescopic structure of the adjusting rod 311, the manipulation handle 300 can stably switch between the ordinary luggage case mode and the riding mode, so that use flexibility, manipulation stability, and comfort of the present invention are improved, and the portability and the ergonomic design of the luggage case are further optimized, to enable the luggage case to be more in line with development requirements of short-distance transportation and intelligent luggage cases.

Figure 7:
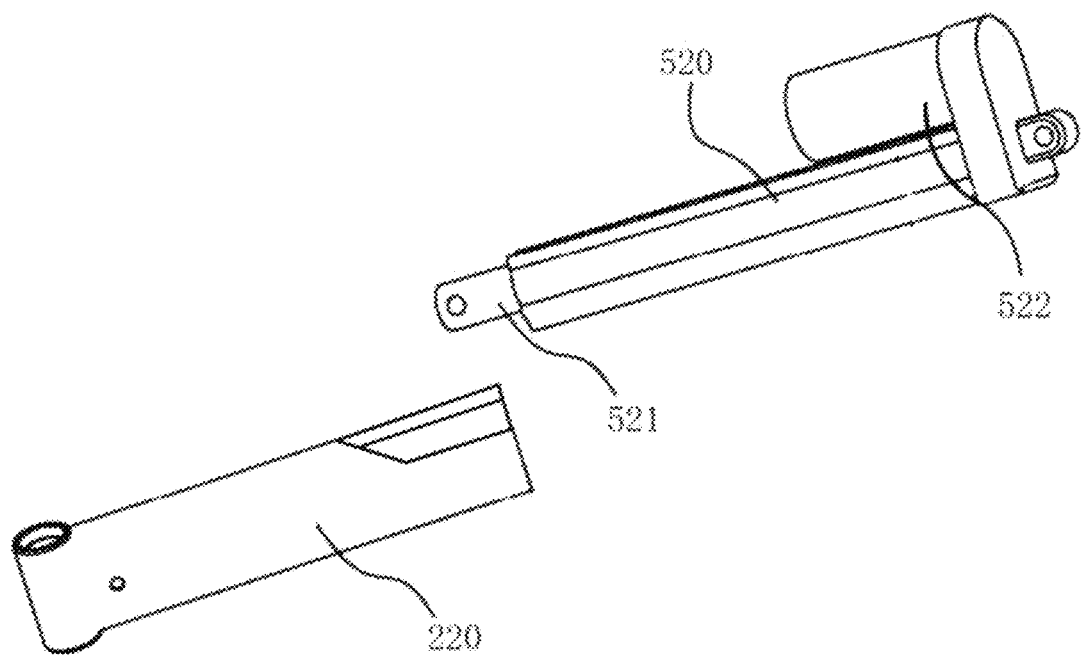
FIG. 7 is a schematic diagram of an electric telescopic rod of a luggage case capable of changing into a travel carrier according to the present invention.
Figure 8:
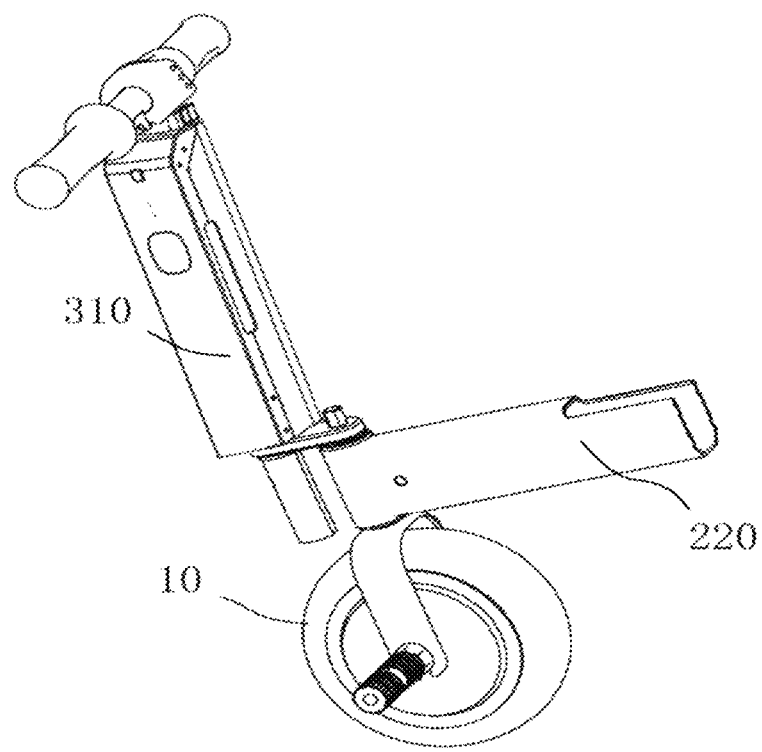
FIG. 8 is a schematic diagram of another example of a luggage case capable of changing into a travel carrier according to the present invention.

Referring to FIG. 7 and FIG. 8, in another embodiment, the driving member is an electric telescopic rod 520, and a mover 521 of the telescopic rod is connected to the telescopic portion 220. The telescopic portion 220 automatically extends or retracts between the riding mode and an accommodated mode through motor driving. Compared with the spring 510 driving solution, in the solution, a structure is simpler, and a constraint of a mechanical elastic assembly is reduced, so that mode switching is more stable and controllable. Meanwhile, a degree of automation is higher, so that the user can switch between the luggage case mode and the riding mode in a one-touch manner without a manual operation.

In the ordinary mode of the luggage case, the electric telescopic rod 520 is in the retracted state, so that the manipulation handle 300 is flush with the top portion of the luggage case and maintains a compact accommodated form, and the user can drag or store the luggage case like an ordinary luggage case. In the riding mode, the user triggers a control signal through a key or through sensing to start a motor of the electric telescopic rod 520, to drive the telescopic portion 220 to extend forward along the sliding rail 230, so that the manipulation handle 300 enters the manipulatable state. At the same time, the storage case 400 remains fixed and is used as the seat. The mode switching process is fully automated without an external force, thereby improving intelligent experience and reducing user operation difficulty.

Core structures of the electric telescopic rod 520 include a driving motor, a screw transmission mechanism, a mover 521 telescopic rod, and a control unit. The motor drives a screw to rotate, to enable the mover 521 in the screw to extend or retract along a preset trajectory, thereby driving the telescopic portion 220 to move. The solution has high accurate controllability, and the user may implement progressive unfolding or quick folding through a key or an intelligent control system. The solution is applicable to a requirement for a high-end intelligent luggage case.

Main advantages of the solution include:
High degree of automation and convenient operation: compared with the spring 510 driving solution, the electric telescopic rod 520 may implement one-touch extension and accommodation without manual unlocking or stretching of the user, thereby improving the user convenience.
Stable, accurate, and controllable extension and retraction processes: the motor driving manner ensures slow start and slow stop and avoids an impact force problem during extension in the spring 510 driving solution, thereby improving structural stability and durability.
Mechanical wear reduction and service life improvement: due to the use of the motor+the screw transmission, a possible problem of elastic fatigue in conventional mechanical spring 510 driving is reduced, so that the luggage case is more durable in mode switching, which is applicable to a high-frequency use scenario.
Strong intelligent expansion capability: the electric telescopic rod 520 may be integrated with the intelligent control system, for example, remote control is performed through Bluetooth, APP, or automatic sensing, thereby further improving intelligent experience of the product.

However, compared with the spring 510 driving, the solution also has certain limitations:
Large weight: since the motor, the screw, and a related electronic control system are added, the overall weight is increased, which may affect the portability, especially in a scenario of boarding or carrying the luggage case by hand.
High costs: the electric telescopic rod 520 relates to a plurality of precision components such as a motor, a transmission mechanism, and a control circuit, and compared with the conventional spring 510 driving solution, the solution has higher manufacturing costs, which is not applicable to all market requirements.
Increased energy consumption requirements: the solution relies on battery power, and if the battery runs out of power, the telescopic portion 220 may not be extended or accommodated normally. Therefore, a backup manual operation manner needs to be equipped to ensure the use in a low battery power state.

In conclusion, in the embodiment, through an automatic design of the electric telescopic rod 520, an intelligent degree of mode switching of the luggage case is improved, so that the user can switch between the riding mode and the ordinary mode more conveniently, which is applicable to a high-end market and an application scenario with a high intelligent requirement. However, the solution also increases the weight and the costs, which is applicable to a user with a high requirement for convenience, a sense of technology, and an automation operation. In a situation of pursuing lightweight and low costs, the spring 510 driving solution may be preferable. According to the electric telescopic rod 520 solution of the present invention, an intelligent manipulation system, remote control, and battery management optimization may be combined to further improve the use experience, thereby providing a more efficient and convenient solution for future development of the intelligent luggage case.

Figure 9:
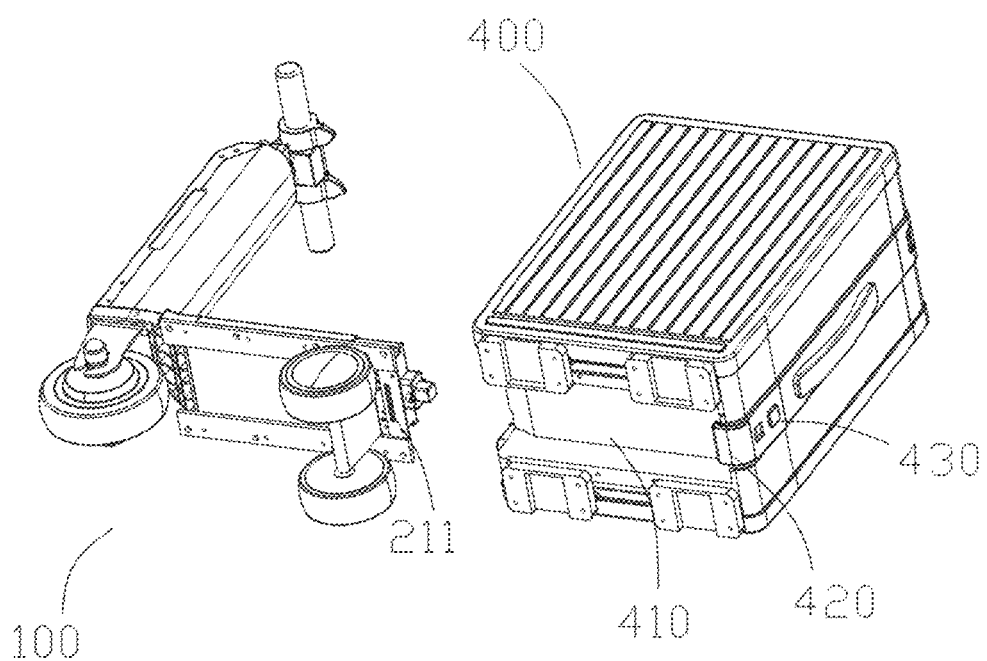
FIG. 9 is a schematic structural diagram of a luggage case capable of changing into a travel carrier according to the present invention.
Figure 10:
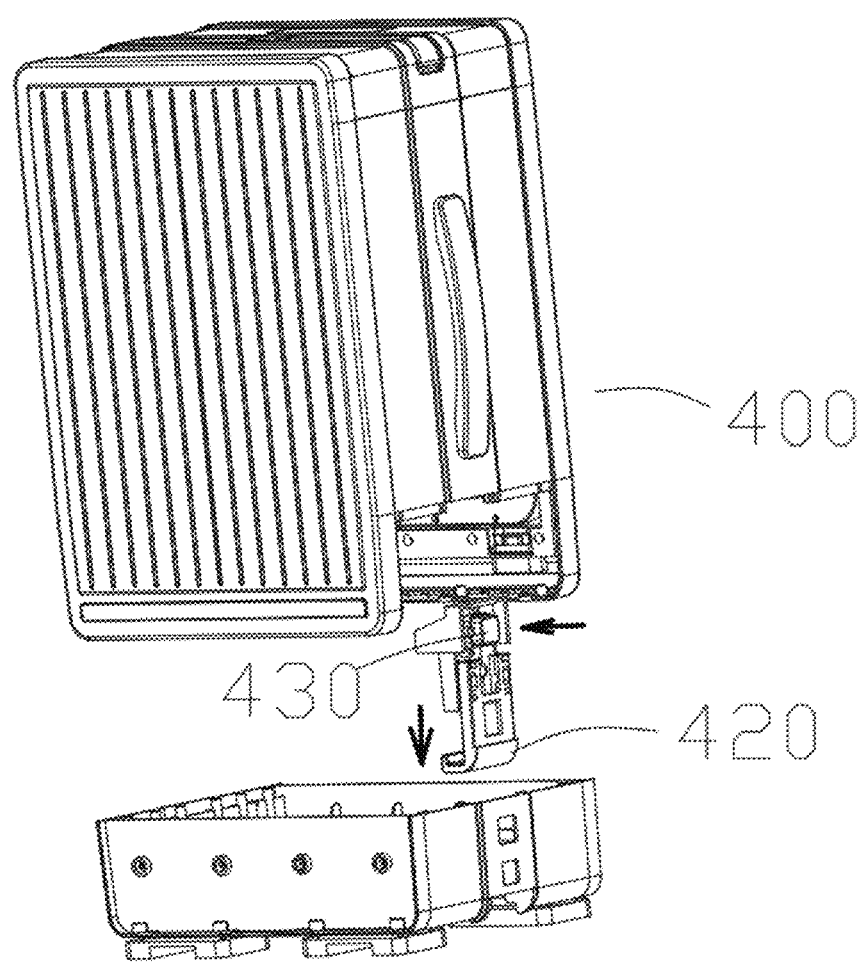
FIG. 10 is a schematic exploded view of a storage case of a luggage case capable of changing into a travel carrier according to the present invention.

Referring to FIG. 9 and FIG. 10, in the embodiment, the storage case 400 is detachably connected to the fixed portion 210. The storage case 400 is detachably connected to the fixed portion 210. A core of the design is to improve adaptability of the product, to enable the luggage case to be used as an ordinary luggage case and an electric transportation tool, thereby meeting requirements of different scenarios.

In the ordinary mode, the user may use the storage case 400 as a part of the conventional luggage case. The storage case 400 provides stable storage space, which is applicable to general purposes such as a daily journey and business travel. In the mode, the manipulation handle 300 of the luggage case may be accommodated, and the overall structure is compact, thereby facilitating dragging or carrying. At the same time, the luggage case meets a size requirement for a boarding case, which is applicable to a scenario such as an air journey and train travel.

In the riding mode, the storage case 400 may be used as the seat. The user can sit on the storage case 400 to manipulate the luggage case to perform transportation riding, to enable the luggage case to become a short-distance travel tool, which is applicable to scenarios such as an airport, an exhibition hall, a large shopping mall, or urban commuting. A detachable design enables the storage case 400 to be fixed on the luggage case when needed, to ensure bearing capacity and stability during riding. When the user only needs to drag the luggage case, the storage case 400 may be removed, to reduce the overall weight, so that the luggage case is lighter.

This detachable structure improves functional diversity and use flexibility of the luggage case, and the user may freely switch the use modes according to actual requirements, to enable the luggage case to play the best role in different environments. Compared with a conventional electric luggage case, the design allows the product to be not limited to a transportation function and to be used as an ordinary luggage case when riding is not needed and avoids a cumbersome problem of the conventional electric luggage case due to different structures such as the motor and the seat, thereby improving adaptability and market competitiveness of the product.

In the embodiment, a bottom end of the storage case 400 is provided with a sliding groove 410, and the fixed portion 210 is located in the sliding groove 410.

A side surface of the storage case 400 is provided with a telescopic hook 420, and the telescopic hook 420 can slide relative to the storage case 400.

The fixed portion 210 is provided with a positioning groove 211, and the telescopic hook 420 can be inserted into the positioning groove 211 to fix the storage case 400. The storage case 400 can slide to be mounted along the sliding rail 230 of the fixed portion 210 through a sliding groove 410 structure, to stably assemble and quickly detach the storage case 400. The sliding groove 410 structure ensures that the storage case 400 can smoothly slide during mounting and can be accurately docked under the guidance of the fixed portion 210, thereby improving stability of the overall structure of the luggage case while ensuring a bearing capability of the storage case 400 in the riding mode.

To ensure that the storage case 400 does not displace or loosen after being mounted, the side surface of the storage case 400 is provided with the telescopic hook 420. The telescopic hook 420 can slide relative to the storage case 400 and is configured to lock and unlock the storage case 400 with the fixed portion 210. After the storage case 400 slides into the sliding groove 410 of the fixed portion 210, the user may adjust a position of the telescopic hook 420 manually or automatically, to enable the telescopic hook to be inserted into the positioning groove 211 on the fixed portion 210, thereby stably fixing the storage case 400.

The design of the positioning groove 211 ensures that the storage case 400 does not fall off due to traveling vibration or an external force impact after being mounted, thereby improving safety and durability. The structure can provide sufficient seat support in the riding mode, to ensure that the storage case 400 does not loosen and fall off during riding of the user. Meanwhile, when the user hopes to use the luggage case in the ordinary luggage case mode, locking of the telescopic hook 420 may be easily released, to enable the storage case 400 to slide out of the fixed portion 210 to be quickly detached, thereby improving use flexibility.

A design of the sliding groove 410+the telescopic hook 420+the positioning groove 211 in the embodiment enables the mounting and detachment of the storage case 400 to be more efficient and convenient and ensures safety and stability of the storage case 400 in the riding and luggage case modes. Compared with a conventional fixed seat design, the solution has higher adaptability, so that the luggage case may be used as the short-distance transportation tool, and the storage case 400 can be detached to reduce the overall weight when riding is not needed, thereby enhancing the portability of the product.

In the embodiment, the side surface of the storage case 400 is provided with a receding button 430, and the receding button 430 is configured to drive the telescopic hook 420 to unlock, so that the storage case 400 can slide to be separated along a direction of the sliding groove 410. The receding button 430 is configured to control unlocking of the telescopic hook 420, so that the storage case 400 can be quickly separated from the fixed portion 210 when detachment is needed, to freely mount and detach the storage case 400, thereby improving use flexibility and convenience of the luggage case.

In a normal use state, the storage case 400 is connected to the fixed portion 210 through the sliding groove 410 structure and is inserted into the positioning groove 211 of the fixed portion 210 through the telescopic hook 420, to ensure that the storage case can be stably fixed in the riding mode, thereby avoiding loosening due to vibration or an external force. However, when hoping to convert the luggage case into the ordinary mode to be used as the storage case only, the user may press the receding button 430 on the side surface of the storage case 400. The button drives the telescopic hook 420 to retract through a mechanical or spring 510 mechanism, to enable the hook to be separated from the positioning groove 211 of the fixed portion 210, thereby unlocking the locked state. At this time, the user may easily slide the storage case 400 along the direction of the sliding groove 410, to implement quick detachment.

The design of the structure simplifies a detachment and mounting procedure of the storage case 400, and the user can mount or detach the storage case 400 without an additional tool, thereby improving the portability of the luggage case. When the riding function is not needed, the user may detach the storage case 400, to reduce the overall weight, so that the luggage case is lighter and meets a daily journey requirement. When the riding mode is needed, the user only needs to slide the storage case 400 into the fixed portion 210 along the sliding groove 410 and press the storage case 400 to enable the telescopic hook 420 to be automatically clamped into the positioning groove 211, to complete locking, so that the luggage case has the riding function.

An unlocking structure of the receding button 430+the telescopic hook 420 in the embodiment has the following technical advantages:

Quick detachment and mounting for improving adaptability: the user only needs to press the button to lock or unlock the storage case 400, thereby improving a switching speed of the luggage case between the ordinary mode and the riding mode.

Enhancing safety and stability: in the locked state, the telescopic hook 420 may be firmly fixed on the storage case 400, to ensure that loosening and falling off do not occur during riding, thereby improving structural stability.

Optimizing user experience: the unlocking is performed by lightly pressing the button without a complex manual operation, thereby reducing a resistance force during detachment and mounting and improving convenience.

Improving functional extensibility of the luggage case: the user may choose to mount or detach the storage case 400 according to a requirement, so that the luggage case may be used as an ordinary storage case and may also be converted into a transportation tool when necessary, thereby improving flexibility of a use scenario.

In conclusion, in the embodiment, the design of controlling the telescopic hook 420 to unlock by the receding button 430 optimizes the mode switching manner of the luggage case, so that the luggage case has good adaptability in different scenarios, thereby meeting requirements of short-distance transportation, a storage function, and a convenient operation of the user and providing more efficient and intuitive use experience for the intelligent luggage case.

The present invention provides the luggage case capable of changing into a travel carrier. Through innovative solutions such as the electric vehicle assembly 100, a telescopic manipulation structure, and a detachable design of the storage case 400, the luggage case may be used as the ordinary luggage case and may also be converted into the short-distance transportation tool, thereby improving the adaptability and intelligent experience of the product.

A core technology of the present invention is that the telescopic manipulation structure is adopted. The manipulation handle 300 controls the front wheel 10 to perform steering through the rotating shaft 310, and the holding height is adjusted by extending and retracting the adjusting rod 311, to adapt to different user requirements. In an aspect of a driving mechanism, two solutions of the spring 510 driving and the electric telescopic rod 520 driving are provided. The spring 510 driving solution has advantages of low costs, light weight, and simple structures, and the electric telescopic rod 520 solution has advantages of a high degree of automation and stable mode switching, to meet different market requirements.

The luggage case adopts the hub motor 600 to directly drive the front wheel 10, and a conventional transmission mechanism is canceled, so that the overall structure is more compact. The battery 330 and the control mainboard 340 are integrated into the manipulation handle 300 to optimize a space layout, so that the storage case 400 is enlarged, thereby improving a storage capability. In addition, the storage case 400 is designed to be of a detachable structure and is matched with the positioning groove 211 through the sliding groove 410 and the telescopic hook 420, to ensure that the storage case is firmly fixed in the riding mode. At the same time, the receding button 430 is equipped, to facilitate quick detachment and mounting of the user, thereby implementing seamless switching between the ordinary luggage case mode and the riding mode.

Compared with the prior art, the present invention has the following significant advantages:

Dual-mode switching for improving adaptability: the present invention may be used as the ordinary luggage case and may also be extended as the electric transportation tool, to meet different travel requirements.

Intelligent driving and accurate manipulation: the hub motor 600 directly performs driving, and the manipulation handle 300 electric control system is combined, to improve traveling stability and safety.

Space layout optimization for improving storage capability: the battery and the control system are integrated into the manipulation handle 300, so that internal storage space of the luggage case is released, thereby ensuring that the storage case 400 has a larger volume.

Detachable storage case 400 for enhancing use flexibility: the user may choose whether to mount the storage case 400, and the storage case 400 is detached to reduce the overall weight when the riding function is not needed, so that the luggage case is lighter.

A plurality of driving manners for meeting different market requirements: the spring 510 driving or the electric telescopic rod 520 driving may be chosen according to the costs and the user preferences, so that the product is applicable to different application scenarios.

Efficient locking and quick detachment and mounting: through the telescopic hook 420+the positioning groove 211+the receding button 430, it is ensured that the storage case 400 is stably mounted and may be quickly detached and mounted, thereby improving the user experience.

In conclusion, combining electric transportation technology, intelligent control, deformable structure, and efficient storage design, the present invention provides a more convenient, practical, and intelligent short-distance travel solution, which is applicable to a plurality of scenarios such as the airport, the exhibition hall, the urban commuting, and the business journey, thereby greatly improving the functionality and market competitiveness of the luggage case and providing a new technical direction for modern portable travel tools.

Finally, it should be noted that the foregoing descriptions are merely preferred embodiments of the present invention, but are not intended to limit the present invention. Although the present invention has been described in detail with reference to the foregoing embodiments, those skilled in the art will readily appreciate that they can make modifications to technical solutions recorded in the embodiments described herein, or make equivalent replacements of some of the features described herein. Any modifications, equivalent replacements, improvements, and the like made within the spirit and principle of the present invention shall fall within the protection scope of the present invention.

What is claimed is:

1. A luggage case capable of changing into a travel carrier, comprising:
    a vehicle assembly, wherein the vehicle assembly comprises a manipulation handle and a chassis with a front wheel and a rear wheel, the chassis comprises a fixed portion and a telescopic portion, a driving member configured to drive the telescopic portion to extend forward is disposed in the fixed portion, and the manipulation handle is mounted on the telescopic portion to be configured to manipulate the front wheel to rotate; and
    a storage case, wherein the storage case is fixedly mounted on the fixed portion of the chassis and is used as a seat in a riding mode; and
    when the driving member drives the telescopic portion to extend forward, the manipulation handle moves from an initial storage position to a manipulatable state to control steering of the front wheel, and the storage case is configured as the seat to bear a weight of a user at the same time;
    wherein the driving member is a telescopic rod, and a mover of the telescopic rod is connected to the telescopic portion.

2. The luggage case capable of changing into a travel carrier according to claim 1, wherein the fixed portion is provided with a sliding rail; and
    a sliding sleeve is sleeved outside the sliding rail, the sliding sleeve can perform reciprocating sliding along a direction of the sliding rail, and the telescopic portion is connected to the fixed portion through the sliding sleeve.

3. The luggage case capable of changing into a travel carrier according to claim 2, wherein the driving member is a spring, the sliding rail is internally provided with a guide groove, and the spring is mounted in the guide groove to abut against the telescopic portion, so that the spring releases an elastic force to drive the telescopic portion to extend forward in an unlocked state.

4. The luggage case capable of changing into a travel carrier according to claim 3, wherein an elastic latch is disposed on a surface of the sliding rail; and front and rear sections of the sliding sleeve are provided with positioning holes respectively, and when the manipulation handle is located at the initial storage position or in the manipulatable state, the elastic latch is located in a corresponding positioning hole, to ensure that the telescopic portion is stably locked in two states.

5. The luggage case capable of changing into a travel carrier according to claim 4, wherein an unlocking button is disposed at a rear end of the sliding rail, and the unlocking button is configured to drive the elastic latch to retract.

6. The luggage case capable of changing into a travel carrier according to claim 1, wherein a hub motor is disposed in the front wheel, and the hub motor is configured to drive the front wheel to rotate to drive the luggage case to travel; and the manipulation handle is electrically connected to the hub motor to be configured to manipulate the hub motor.

7. The luggage case capable of changing into a travel carrier according to claim 1, wherein the manipulation handle is mounted on the telescopic portion through a rotating shaft; and a housing is sleeved outside the rotating shaft, a gap is formed between the housing and the rotating shaft, and a battery and a control mainboard are disposed in the gap.

8. The luggage case capable of changing into a travel carrier according to claim 1, wherein the storage case is detachably connected to the fixed portion.

9. The luggage case capable of changing into a travel carrier according to claim 8, wherein a bottom end of the storage case is provided with a sliding groove, and the fixed portion is located in the sliding groove;

a side surface of the storage case is provided with a telescopic hook, and the telescopic hook can slide relative to the storage case; and the fixed portion is provided with a positioning groove, and the telescopic hook can be inserted into the positioning groove to fix the storage case.

10. The luggage case capable of changing into a travel carrier according to claim 9, wherein the side surface of the storage case is provided with a receding button, and the receding button is configured to drive the telescopic hook to unlock, so that the storage case can slide to be separated along a direction of the sliding groove.

* * * * *